May 10, 1932.  R. STRESAU ET AL  1,857,521
METALLIC ARC WELDING ELECTRODE
Filed May 31, 1930

INVENTOR.
Richard Stresau
and John J. Chyle
BY
ATTORNEY.

Patented May 10, 1932

1,857,521

UNITED STATES PATENT OFFICE

RICHARD STRESAU, OF WAUWATOSA, AND JOHN J. CHYLE, OF MILWAUKEE, WISCONSIN, ASSIGNORS TO A. O. SMITH CORPORATION, OF MILWAUKEE, WISCONSIN, A CORPORATION OF NEW YORK

METALLIC ARC WELDING ELECTRODE

Application filed May 31, 1930. Serial No. 457,850.

The present invention relates to an improved form of welding electrode for use in metallic arc welding.

An object of the invention is to provide a composite electrode for welding seams requiring a large deposit of welding material.

The invention resides in forming a composite welding electrode of a plurality of separate metallic rods, spaced from each other, and embedded in a covering material of a composition herein set forth and joined at one end in good electrical contact with each other.

The invention will be best understood by referring to the accompanying drawings in which.

Figure 1:
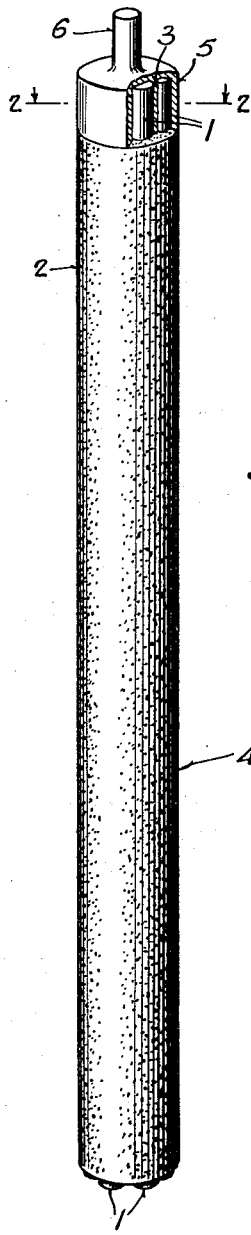
Figure 1 is a perspective view of a composite welding electrode made in accordance with a preferred embodiment of the present invention, having a portion of the metallic head broken away.
Figure 2:
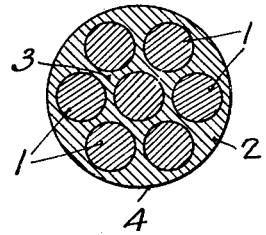
Fig. 2 is a transverse sectional view of the metallic head of the electrode taken on the line 2—2 of Figure 1.
Figure 3:
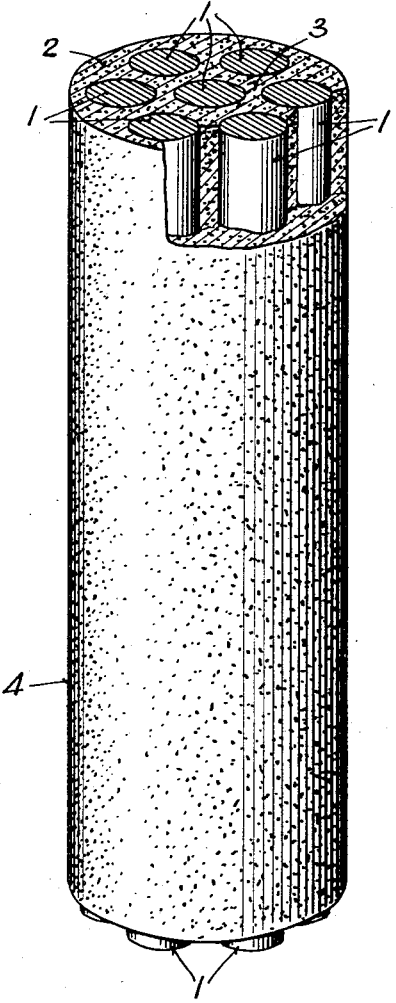
Fig. 3 is an enlarged perspective view of the welding electrode showing a portion of the covering broken away.

The composite welding electrode comprises a plurality of metallic rods 1 of the desired composition. Seven of such rods are preferably employed, and they are preferably arranged with six in circular disposition about the seventh. However, the number and arrangement are not of the essence of the invention and are to be determined by the conditions under which the composite electrode is intended to be used.

It is desirable that the rods 1 be spaced equally distant from each other and that they be fixed in a substantially parallel relationship. This tends to insure uniform welding conditions and consequently to improve the final weld.

The rods 1 are supported in their spaced positions, and a plastic composition 2 which flows under pressure is applied to the grouped rods. The plastic composition 2 is caused to fill the interstices 3 between rods 1 and to enclose the group of rods and to form a composite electrode 4 of a substantially cylindrical shape.

The plastic composition 2 is dried by baking or by other suitable manner and forms a more or less solid mass of insulating and heat resisting material.

The material used as a covering for the rods may be of any suitable nature, but it should possess gas conserving and heat resisting properties, the latter of which will cause it to disintegrate slowly. It is also a feature of the present invention that the material used as covering and insulation be such that the electric arc at the arcing end of the composite weldrod will cause the covering to disintegrate and to leave a residue such as carbon. This residue conducts current and serves as a bridge for the arc by means of which the arc moves from one arcing rod to a rod next adjacent.

For these purposes it has been found advantageous to use a carbohydrate covering preferably in the form of wood flour or sawdust mixed with silicate of soda to form a plastic compound of such consistency that it may be made to flow under pressure and to form itself about the separate rods of the composite electrode.

The upper ends of the grouped rods 1 are left bare for a short distance, or the coating may be stripped from the electrode before hardening.

The bare upper ends of the rods 1 are connected by a good conductor of current so that each rod is connected to the source of welding current. The ends are preferably connected by casting an aluminum cap 5 about the ends which project above the coating. The cap 5 has a tapered shank 6 integral therewith which serves to establish electrical contact with a terminal of the source of welding current.

It is not essential, however, that the electrical conductor be of cast aluminum. The upper ends may be joined by welding, brazing, soldering and other means such as clamping. One of the rods may be longer than the rest to provide a shank to which the terminal of the source of power is attached. Various modifications of the present invention may be utilized.

As indicated herein, the purpose of the present invention is to secure proper conditions in the weld, where the deposit of a large quantity of welding material is required. The composite welding electrode as above described is particularly adaptable to the deposition of lining materials on a metal surface as in the lining of pressure vessels with alloy metals.

In operation, each rod constitutes an independent circuit and the arc travels in a circular course at what is herein described as the "arcing end" of the weldrod. The heat of the arc causes the coating to disintegrate slowly and to leave a residue (chiefly of carbon) which forms a bridge between the arcing rod and the one next adjacent. As the arcing rod is fused away, the distance between the end of the same and the work increases. Likewise, the resistance increases until it becomes greater than the resistance between the bridge formed of the residue, when the arc will spring from the bridge to the work for an instant, and following the lines of least resistance, will travel to the rod next adjacent the one designated as the arcing rod.

In this manner the arc passes from the point of one rod to that of the next as each rod is consumed in part and the arc lengthened, until the cycle is completed. The arc builds its own bridges and adjusts its position according to the lines of least resistance. The tendency of the arc to follow this circuitous route avoids excessive heating of the electrode and contributes to the deposition of more sound weld metal.

The preferred embodiment shown in the accompanying drawings is a composite welding electrode of cylindrical shape. It is not necessary to the invention, however, that this shape be used, as various polygonal shapes would serve as well. The cylindrical form of construction, however, is much preferred for reasons involved in its manufacture.

While the invention has been set forth in its preferred form, various modifications may be utilized.

We claim:

1. A composite electrode for arc welding comprising, in combination, a plurality of metallic rods, a binder possessing insulating properties carrying the rods in spaced relation, said binder being subject to decomposition by the heat generated by the arc and capable of giving a residue which electrically connects the ends of the rods being fused to facilitate the transfer of the arc from one rod to another, and means for delivering current to the metallic rods at the end of the electrode opposite from the arc.

2. A composite electrode for arc welding comprising, in combination, a plurality of metallic rods, a binder possessing insulating properties carrying the rods in parallel spaced relation, said binder being subject to decomposition by the heat generated by the arc and capable of giving a residue which has a low resistance to the flow of electric current to facilitate transfer of the arc from one rod to another, and means for delivering current to the metallic rods at the upper end of the electrode.

3. A composite electrode for electric arc welding comprising a plurality of rods, a carbohydrate insulating material enveloping said rods and maintaining them in spaced parallel relationship, said insulating material being adapted to be decomposed at the arcing end of said rods by the heat of the electric arc and to leave a carbonaceous residue between the arcing ends of the rods which provides a bridge for the arc between said rods, and means at the opposite end of said rod comprising a metallic cap having an upwardly disposed shank for establishing electrical contact with each of the component rods.

4. A composite electrode for electric arc welding comprising a plurality of rods spaced at equal distances from each other in a parallel relationship, a carbohydrate insulating material disposed in the interstices of the composite weldrod and enveloping the same and adapted to be decomposed by the heat of the arc at the arcing end of the rods to form a carbon residue which conducts the electric arc from the arcing end of one component rod to the end of a rod next adjacent, and common means at the opposite end thereof for conducting electrical current to the composite electrode from a source of power.

5. A method of electric arc welding with a composite electrode provided with a plurality of metallic rods held in spaced relation by a decomposable binder, comprising establishing an arc with one of the rods, maintaining the arc until a portion of the rod is deposited and the binder at the end of the electrode decomposed giving a residue which has a low resistance to the flow of electricity to facilitate the transfer of the arc from one metallic rod to another when the rod holding the arc has been shortened by the process of arc deposit, whereby the arc moves from rod to rod during the welding process.

6. A composite electrode for arc welding comprising, in combination, a plurality of metallic rods, a binder possessing insulating properties carrying the rods in spaced relation, said binder being subject to decomposition by heat generated by the arc, the binder when decomposed giving a residue of carbon which offers a low resistance to the flow of the electricity, the carbon residue facilitating the transfer of the arc from one rod to another, and means for delivering current to the metallic rods at the upper end of the electrode.

In witness whereof we have signed our names at Milwaukee, Wisconsin, this 28th day of May, 1930.

RICHARD STRESAU.
JOHN J. CHYLE.